United States Patent
Liu et al.

(10) Patent No.: US 11,238,257 B2
(45) Date of Patent: Feb. 1, 2022

(54) FINGERPRINT IDENTIFICATION SUBSTRATE, FINGERPRINT IDENTIFICATION METHOD AND DISPLAY DEVICE

(71) Applicant: BOE Technology Group Co., Ltd., Beijing (CN)

(72) Inventors: Yingming Liu, Beijing (CN); Xue Dong, Beijing (CN); Haisheng Wang, Beijing (CN); Chunwei Wu, Beijing (CN); Xiaoliang Ding, Beijing (CN); Rui Xu, Beijing (CN); Changfeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 656 days.

(21) Appl. No.: 16/086,396

(22) PCT Filed: Mar. 1, 2018

(86) PCT No.: PCT/CN2018/077740
§ 371 (c)(1),
(2) Date: Sep. 19, 2018

(87) PCT Pub. No.: WO2018/223735
PCT Pub. Date: Dec. 13, 2018

(65) Prior Publication Data
US 2021/0216734 A1     Jul. 15, 2021

(30) Foreign Application Priority Data
Jun. 7, 2017   (CN) .......................... 201710424480.8

(51) Int. Cl.
*G06K 9/00*       (2006.01)
*G06F 21/32*      (2013.01)
(Continued)

(52) U.S. Cl.
CPC ........... *G06K 9/0002* (2013.01); *G06K 9/001* (2013.01); *G06K 9/00087* (2013.01);
(Continued)

(58) Field of Classification Search
CPC ...... G06K 9/0002; G06K 9/001; G06F 21/32; G06F 21/84; G10K 9/122; G01S 7/52061; G01N 29/22
(Continued)

(56) References Cited

U.S. PATENT DOCUMENTS

2014/0352440 A1* 12/2014 Fennell .................. G01N 29/22
                                                             73/632
2014/0359757 A1    12/2014 Sezan et al.
(Continued)

FOREIGN PATENT DOCUMENTS

CN    105093593 A    11/2015
CN    105264543 A    1/2016
(Continued)

OTHER PUBLICATIONS

Office Action dated Apr. 1, 2020 for application CN201710424480.8 with English Translation attached.
(Continued)

*Primary Examiner* — Abdul-Samad A Adediran
(74) *Attorney, Agent, or Firm* — Nath, Goldberg & Meyer; Joshua B. Goldberg

(57) ABSTRACT

A fingerprint identification substrate, a fingerprint identification method and a display device are provided. The fingerprint identification substrate includes a base substrate, a transmitting part and a receiving part provided on the base substrate, and a fingerprint detector. At least a portion of the transmitting part and at least a portion of the receiving part may be provided in a single layer. The transmitting part is configured to generate an ultrasonic signal. The receiving
(Continued)

part is configured to receive the ultrasonic signal reflected by a finger, convert the ultrasonic signal into an electric signal, and output the electric signal to the fingerprint detector. The fingerprint detector is configured to determine fingerprint information according to the electric signal output from the receiving part.

12 Claims, 4 Drawing Sheets

(51) Int. Cl.
  *G06F 21/84* (2013.01)
  *G10K 9/122* (2006.01)
(52) U.S. Cl.
  CPC .............. *G06F 21/32* (2013.01); *G06F 21/84* (2013.01); *G10K 9/122* (2013.01)
(58) Field of Classification Search
  USPC .......................................................... 73/632
  See application file for complete search history.

(56) References Cited

U.S. PATENT DOCUMENTS

| 2015/0165479 | A1 | 6/2015 | Lasiter et al. |
| 2016/0107194 | A1 | 4/2016 | Panchawagh et al. |
| 2016/0260380 | A1 | 9/2016 | Yang |
| 2017/0090024 | A1* | 3/2017 | Kitchens, II ........ G01S 7/52061 |
| 2018/0151122 | A1 | 5/2018 | Ding et al. |

FOREIGN PATENT DOCUMENTS

| CN | 105264545 | A | 1/2016 |
| CN | 105393261 | A | 3/2016 |
| CN | 105427802 | A | 3/2016 |
| CN | 105980968 | A | 9/2016 |
| CN | 106250834 | A | 12/2016 |
| CN | 205788139 | U | 12/2016 |
| CN | 106598327 | A | 4/2017 |
| CN | 106782085 | A | 5/2017 |
| CN | 107220630 | A | 9/2017 |
| KR | 10-2017-0042532 | A | 4/2017 |
| WO | 2016/174353 | A1 | 11/2016 |
| WO | 2017/053877 | A2 | 3/2017 |

OTHER PUBLICATIONS

First Office Action dated Apr. 25, 2019 corresponding to Chinese application No. 201710424480.8.
International Search Report of PCT/CN2018/077740, dated Jun. 5, 2018, with English translation of the International Search Report, Form PCT/IA/210 and the English translation of the Written Opinion of the International Searching Authority, Form PCT/ISA/237.
Search Report dated Feb. 18, 2021 issued in corresponding European Application No. 18765345.6.

* cited by examiner

FINGERPRINT IDENTIFICATION SUBSTRATE, FINGERPRINT IDENTIFICATION METHOD AND DISPLAY DEVICE

CROSS-REFERENCE TO RELATED APPLICATIONS

This is a National Phase Application filed under 35 U.S.C. 371 as a national stage of PCT/CN2018/077740, filed Mar. 1, 2018, and claims priority from Chinese Application No. 201710424480.8 filed Jun. 7, 2017, the content of each of which is hereby incorporated by reference in its entirety.

TECHNICAL FIELD

The present disclosure relates to the field of display technology, and in particular, to a fingerprint identification substrate, a fingerprint identification method and a display device.

BACKGROUND

Fingerprint includes a series of ridges and valleys at a surface of fingertip skin, and is unique for everyone, thus personal identity may be verified by identifying the fingerprint. Conventional fingerprint identification technology includes optical imaging, thermal sensing, human body infrared sensing and so on.

SUMMARY

The present disclosure provides a fingerprint identification substrate, a fingerprint identification method and a display device with a fingerprint identification function, which utilize ultrasonic.

An aspect of the present disclosure provides a fingerprint identification substrate including: a base substrate; a transmitting part provided on the base substrate and configured to generate an ultrasonic signal; a receiving part provided on the base substrate and configured to receive the ultrasonic signal reflected by a finger, convert the ultrasonic signal into an electric signal, and output the electric signal to a fingerprint detector; and the fingerprint detector configured to determine fingerprint information according to the electric signal output from the receiving part, at least a portion of the transmitting part and at least a portion of the receiving part being provided in a single layer.

In some implementations, the transmitting part may include a first electrode, a first piezoelectric material layer and a second electrode provided successively in a direction away from the base substrate, and the receiving part may include a third electrode, a second piezoelectric material layer and a fourth electrode provided successively in a direction away from the base substrate.

In some implementations, the first piezoelectric material layer and the second piezoelectric material layer may be provided in a single layer, and may be formed into a single structure by a same material.

In some implementations, the first electrode and the third electrode may be provided in a single layer and formed of a same material.

In some implementations, the second electrode and the fourth electrode may be formed in a single layer and formed of a same material.

In some implementations, the fingerprint identification substrate may further include a plurality of driving signal lines, a plurality of read signal lines and a plurality of reset signal lines provided above the base substrate, the fingerprint detector may include a rectifying diode, a first transistor, a second transistor and a third transistor, a first electrode of the rectifying diode is connected to the third electrode, a second electrode of the rectifying diode is connected to a first node, a first electrode of the first transistor is connected to the corresponding read signal line, a second electrode of the first transistor is connected to a first electrode of the second transistor, a control electrode of the first transistor is connected to the driving signal line in $(N+1)^{th}$ row, where N is an integer larger than or equal to 1, the first electrode of the second transistor is connected to the second electrode of the first transistor, a second electrode of the second transistor is connected to a first power supply terminal, a control electrode of the second transistor is connected to the first node, a first electrode of the third transistor is connected to the corresponding reset signal line, a second electrode of the third transistor is connected to the first node, a control electrode of the third transistor is connected to the driving signal line in $N^{th}$ row, the first node is a connection node connected to the second electrode of the third transistor, the second electrode of the rectifying diode and the control electrode of the second transistor.

In some implementations, the fingerprint identification substrate may further include a plurality of data lines and a plurality of pixel units, each pixel unit may include a fourth transistor, a fifth transistor, a first storage capacitor and an organic electroluminescent diode, a first electrode of the fourth transistor is connected to the corresponding data line, a second electrode of the fourth transistor is connected to a control electrode of the fifth transistor and a first terminal of the first storage capacitor, a control electrode of the fourth transistor is connected to the driving signal line in $(N+1)^{th}$ row, a first electrode of the fifth transistor is connected to a high level power supply terminal, a second electrode of the fifth transistor is connected to a first electrode of the organic electroluminescent diode and a second terminal of the first storage capacitor, a second electrode of the organic electroluminescent diode is connected to a low level power supply terminal.

In some implementations, the first transistor and the second transistor may be low temperature polysilicon thin film transistors, and the third transistor, the fourth transistor and the fifth transistor may be oxide based thin film transistors.

In some implementations, the fingerprint identification substrate may further include a first electrode line connected to the first electrode, the fingerprint detector may further include a second storage capacitor, a first terminal of the second storage capacitor is connected to the first node, and a second terminal of the second storage capacitor is connected to the first electrode line.

In some implementations, the fingerprint identification substrate may be divided into a plurality of pixel regions, and each pixel region is provided with one transmitting part and one receiving part.

In some implementations, the fingerprint identification substrate may further include an air cavity below the transmitting part.

In some implementations, the first electrode and the second electrode may be plate electrodes.

Another aspect of the present disclosure provides a fingerprint identification method using the fingerprint identification substrate described above, the fingerprint identification method includes: step S1, applying a driving voltage to the transmitting part so as to drive the transmitting part to generate an ultrasonic signal; step S2, receiving, by the receiving part, the ultrasonic signal reflected by a finger, converting the ultrasonic signal into an electric signal and outputting the electric signal to the fingerprint detector; and step S3, determining fingerprint information, by the fingerprint detector, according to the electric signal output from the receiving part.

In some implementations, the step S3 may include: a reset stage, inputting a high level signal to the driving signal line in $N^{th}$ row, and inputting a reset signal to the reset signal line; a charge accumulation stage, waiting for a period of time; and a read stage, inputting a low level signal to the driving signal line in $N^{th}$ row, inputting a high level signal to the driving signal line in $(N+1)^{th}$ row, inputting a first power supply voltage to the first power supply terminal, and determining the fingerprint information by reading a potential of the first electrode of the second transistor through the read signal line.

Still another aspect of the present disclosure provides a display device including the above-described fingerprint identification substrate which is configured to be a display substrate.

DESCRIPTION OF EMBODIMENTS

In order to make a person skilled in the art understand technical solutions of the present disclosure better, the present disclosure will be described in detail below in conjunction with accompanying drawings and specific embodiments.

Figure 1:
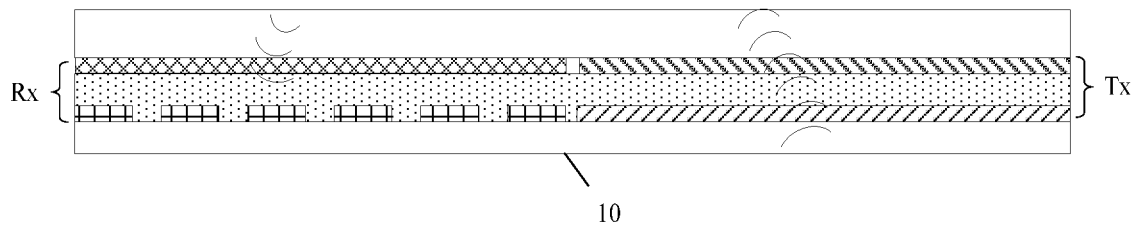
FIG. 1 shows a structural diagram of a fingerprint identification substrate in accordance with an embodiment of the present disclosure.

As shown in FIG. 1, an embodiment of the present disclosure provides a fingerprint identification substrate including: a base substrate 10; a transmitting part TX and a receiving part RX provided on the base substrate 10; and a fingerprint detector. At least a portion of the transmitting part TX and at least a portion of the receiving part RX may be provided in a single layer. The transmitting part TX is configured to generate and transmit an ultrasonic signal. The receiving part RX is configured to receive the ultrasonic signal reflected by a finger, convert the ultrasonic signal into an electric signal, and output the electric signal to the fingerprint detector. The fingerprint detector is configured to determine fingerprint information according to the electric signal output from the receiving part RX.

In the embodiment, when a driving voltage is applied to the transmitting part TX, the transmitting part TX generates the ultrasonic signal and transmits the ultrasonic signal towards the finger. The receiving part RX receives the ultrasonic signal reflected by the finger, convert the ultrasonic signal into the electric signal, and output the electric signal to the fingerprint detector. The fingerprint detector determines the fingerprint information according the electric signal output from the receiving part RX. The fingerprint identification substrate of the present embodiment employs an ultrasonic device to achieve a fingerprint identification function. In the embodiment, at least a portion of the transmitting part TX and at least a portion of the receiving part RX are provided in a single layer, thus may be manufactured by a single patterning process, resulting in a reduced manufacturing cost and an increased production capacity.

Figure 2:
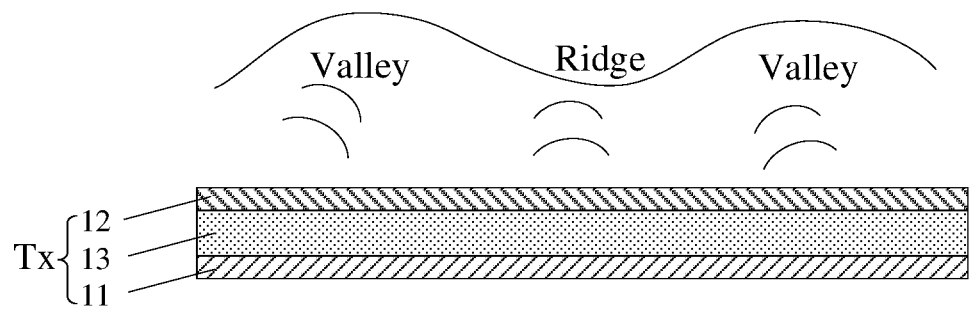
FIG. 2 shows a diagram of a transmitting part in the fingerprint identification substrate in accordance with an embodiment of the present disclosure.

As shown in FIG. 2, the transmitting part TX may include a first electrode 11, a first piezoelectric material layer 13 and a second electrode 12 provided successively in a direction away from the base substrate 10. When a driving voltage is applied across the first electrode 11 and the second electrode 12, the first piezoelectric material layer 13 between the first electrode 11 and the second electrode generates an ultrasonic signal. In some implementations, an air cavity may be provided below the transmitting part TX to enhance the ultrasonic signal so that the ultrasonic signal can be transmitted out better. In some implementations, the first electrode 11 and the second electrode 12 may be plate electrodes, respectively, but the present disclosure is not limited thereto.

Figure 3:
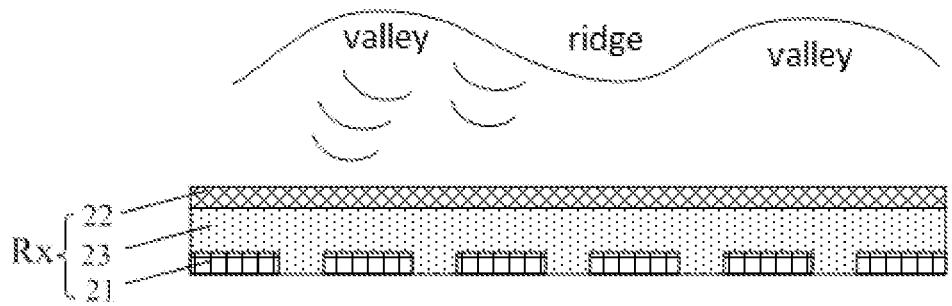
FIG. 3 shows a diagram of a receiving part in the fingerprint identification substrate in accordance with an embodiment of the present disclosure.

As shown in FIG. 3, the receiving part RX may include: a third electrode 21, a second piezoelectric material layer 23 and a fourth electrode 22 provided successively in a direction away from the base substrate 10. When the fourth electrode 22 (e.g., may be connected to a fixed electrical potential) of the receiving part RX receives the ultrasonic signal reflected by the finger, the second piezoelectric material layer 23 converts the received ultrasonic signal into the electric signal (e.g., a voltage signal), and output the electric signal to the fingerprint detector through the third electrode 21. Since the ultrasonic signal reflected by a valley of fingerprint is different from the ultrasonic signal reflected by a ridge of fingerprint (e.g., in intensity or amplitude), the electric signal obtained by converting, by the second piezoelectric material layer 23, the ultrasonic signal reflected by the valley of fingerprint is different from the electric signal obtained by converting, by the second piezoelectric material layer 23, the ultrasonic signal reflected by the ridge of fingerprint (e.g., in voltage). That is, the third electrode 21 outputs the different electric signals so that the fingerprint detector can determine the fingerprint information according to the electric signals output from the third electrode 21.

In some implementations, the first piezoelectric material layer 13 of the transmitting part TX and the second piezoelectric material layer 23 of the receiving part RX may be provided in a single layer and formed into a single structure by a same material. That is to say, the first piezoelectric material layer 13 and the second piezoelectric material layer 23 may occupy a single layer of the fingerprint identification substrate, as shown in FIG. 1, thus may be manufactured by a single patterning process, which results in a reduced manufacturing cost and an increased production capacity.

In some implementations, the first electrode 11 of the transmitting part TX and the second electrode 21 of the receiving part RX may be provided in a single layer and formed of a same material, so as to achieve a reduced manufacturing cost and an increased production capacity. In some implementations, the second electrode 12 of the transmitting part TX and the fourth electrode 22 of the receiving part RX may be provided in a single layer and formed of a same material, so as to achieve a reduced manufacturing cost and an increased production capacity. In some implementations, the first electrode 11 of the transmitting part TX and the third electrode 21 of the receiving part RX may be provided in a single layer and formed of a same material, the second electrode 12 of the transmitting part TX and the fourth electrode 22 of the receiving part RX may be provided in a single layer and formed of a same material, and the first piezoelectric material layer 13 of the transmitting part TX and the second piezoelectric material layer 23 of the receiving part RX may be provided in a single layer and formed of a same material. That is to say, the transmitting part TX and the receiving part RX may be provided in parallel, as shown in FIG. 1, to achieve a further reduced manufacturing cost and a further increased production capacity.

In some implementations, the second electrode 12 of the transmitting part TX and the fourth electrode 22 of the receiving part RX may be connected to a single fixed electrical potential during operating, or may be connected to different fixed electrical potentials, respectively during operating.

Figure 5:
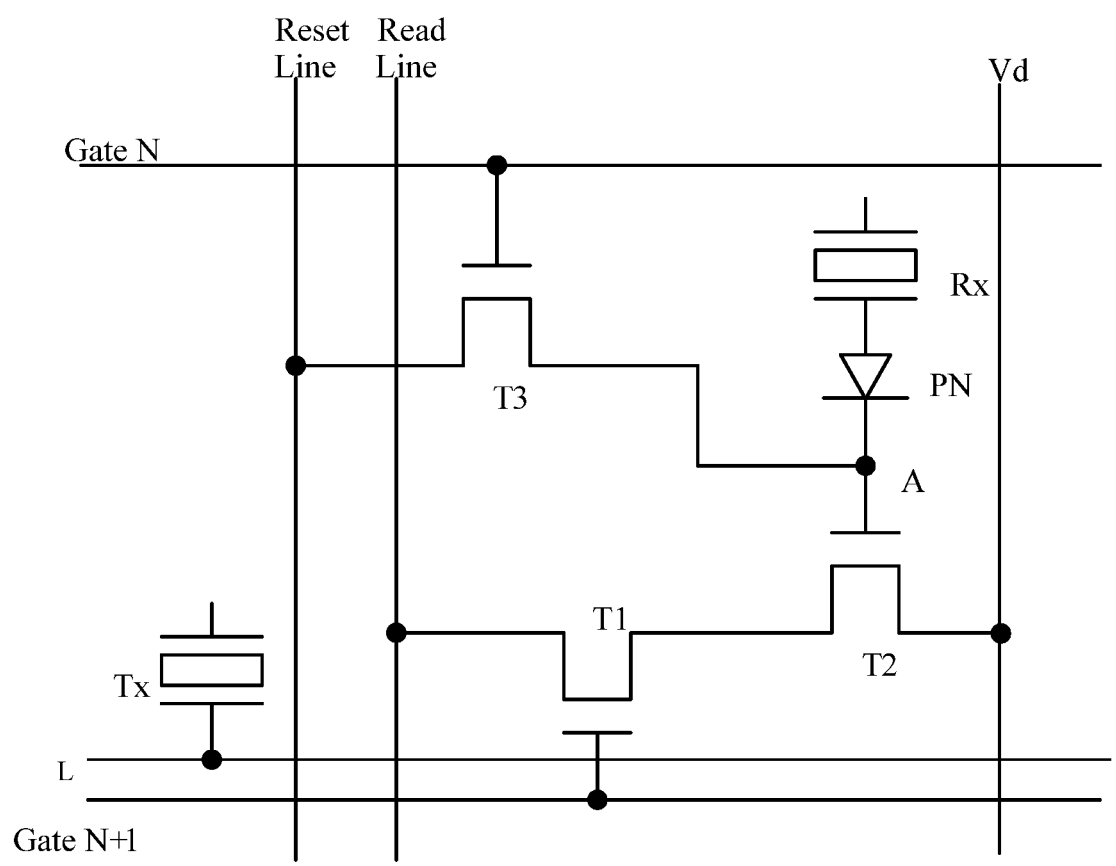
FIG. 5 shows a circuit diagram of a fingerprint detector in the fingerprint identification substrate in accordance with an embodiment of the present disclosure.

As shown in FIG. 5, the fingerprint identification substrate may further include a plurality of driving signal lines Gate N, a plurality of read signal lines Read Line and a plurality of reset signal lines Reset Line provided above the base substrate 10, where N is an integer larger than or equal to 1. The fingerprint detector may include a rectifying diode PN, a first transistor T1, a second transistor T2 and a third transistor T3. In the fingerprint detector, a first electrode of the rectifying diode PN is connected to the third electrode 21, a second electrode of the rectifying diode PN is connected to a first node A, a first electrode of the first transistor T1 is connected to the corresponding read signal line Read Line, a second electrode of the first transistor T1 is connected to a first electrode of the second transistor T2, a control electrode of the first transistor T1 is connected to the driving signal line Gate N+1 in $(N+1)^{th}$ row, the first electrode of the second transistor T2 is connected to the second electrode of the first transistor T1, a second electrode of the second transistor T2 is connected to a first power supply terminal Vd, a control electrode of the second transistor T2 is connected to the first node A, a first electrode of the third transistor T3 is connected to the corresponding reset signal line Reset Line, a second electrode of the third transistor T3 is connected to the first node A, a control electrode of the third transistor T3 is connected to the driving signal line Gate N in $N^{th}$ row, the first node A is a connection node connected to the second electrode of the third transistor T3, the second electrode of the rectifying diode PN and the control electrode of the second transistor T2. The fingerprint identification substrate may further include a first electrode line L connected to the first electrode 11 of the transmitting part TX, and the first electrode line L provides a voltage signal to the first electrode 11.

Figure 6:
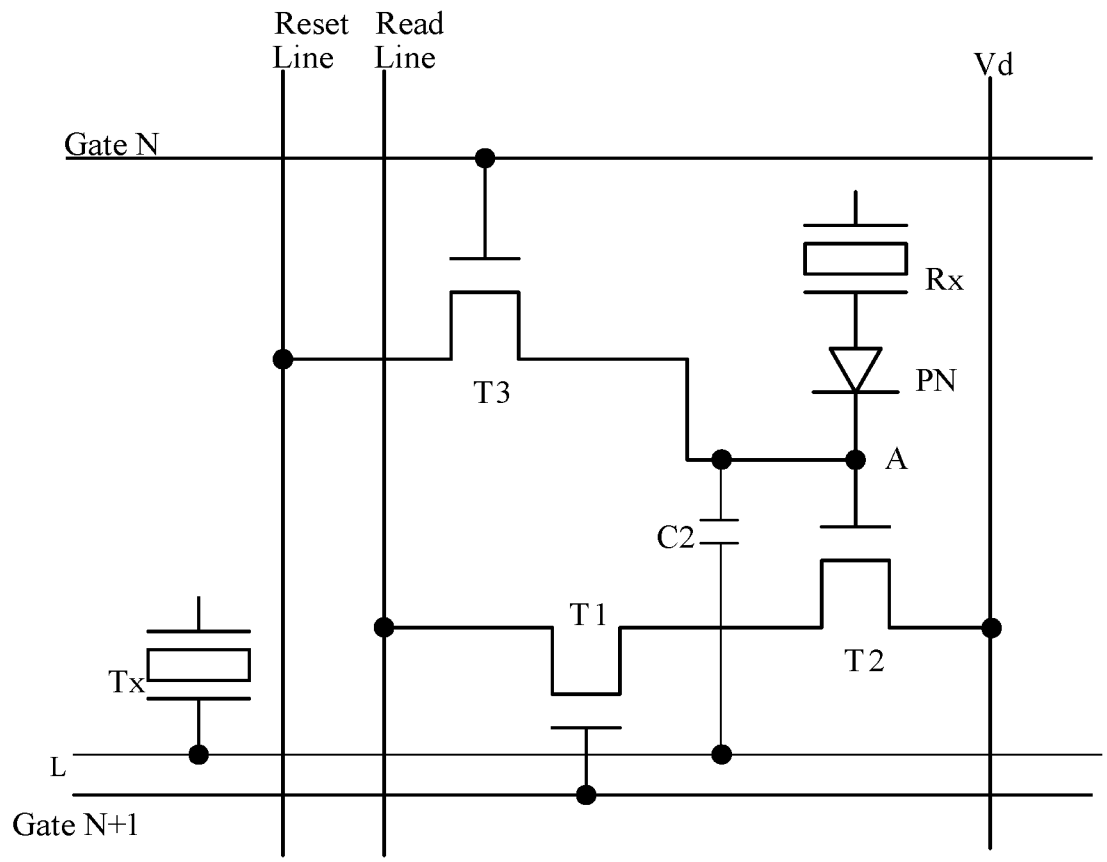
FIG. 6 shows another circuit diagram of the fingerprint detector in the fingerprint identification substrate in accordance with an embodiment of the present disclosure.

As shown in FIG. 6, the fingerprint detector may further include a second storage capacitor C2, a first terminal of the second storage capacitor C2 is connected to the first node A, and a second terminal of the second storage capacitor C2 is connected to the first electrode line L. As will be described below, the second storage capacitor C2 may be configured to maintain the electrical potential of the first node A.

Figure 4:
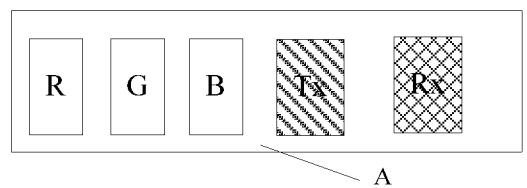
FIG. 4 shows a diagram of a pixel region of the fingerprint identification substrate being used as a display substrate in accordance with an embodiment of the present disclosure.

The fingerprint identification substrate of the embodiment may be used as a display substrate of a display device. The display substrate may be divided into a plurality of pixel regions, and each pixel region may be provided with at least one transmitting part TX and at least one receiving part RX so as to identify the fingerprint more accurately. As shown in FIG. 4, each pixel region may include one transmitting part TX, one receiving part RX and at least one sub-pixel (e.g., red sub-pixel R, green sub-pixel G, blue sub-pixel B or the like). When the fingerprint identification substrate is used as the display substrate, the fingerprint identification substrate may be provided at a front side of a TFT substrate in the display device so that the transmitting part TX is close to a touch body (e.g., a finger), which facilitates the ultrasonic signal generated by the transmitting part TX to reach the touch body, resulting in an improved touch accuracy.

While identifying the fingerprint by the fingerprint identification substrate being used as the display substrate, pixel units in rows of the display substrate are scanned row by row to display corresponding gray scales, respectively, thus the display substrate is driven to perform displaying, thereby an integration of fingerprint identification and displaying is achieved.

Figure 7:
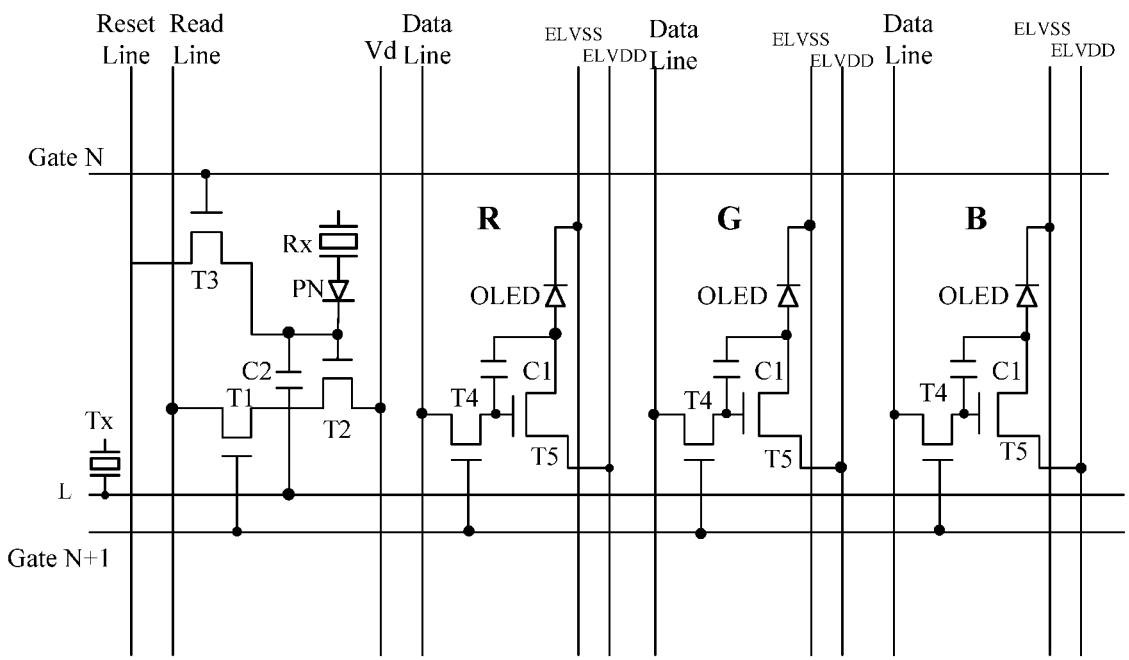
FIG. 7 shows a circuit diagram of a pixel region in the fingerprint identification substrate being used as the display substrate in accordance with an embodiment of the present disclosure.

As shown in FIG. 7, when the fingerprint identification substrate is used as the display substrate, the display substrate may include a plurality of data lines Data Line. Each pixel region of the display substrate may include one fingerprint detector (e.g., the fingerprint detector shown in FIG. 5 or 6) and at least one pixel unit (e.g., one red pixel unit, one green pixel unit and one green blue pixel unit). For example, the red pixel unit may include a fourth transistor T4, a fifth transistor T5, a first storage capacitor C1 and a red organic electroluminescent diode OLED. The green pixel unit or the blue pixel unit is different from the red pixel unit in that the organic electroluminescent diode OLED of the green pixel unit or the blue pixel unit emits light with a color different from that of the red pixel unit, and other aspects of the green pixel unit or the blue pixel unit are the same as those of the red pixel unit, thus detailed description thereof will not be repeated here.

In each pixel unit, a first electrode of the fourth transistor T4 is connected to the corresponding data line Data Line, a second electrode of the fourth transistor T4 is connected to a control electrode of the fifth transistor T5 and a first terminal of the first storage capacitor C1, a control electrode of the fourth transistor T4 is connected to the driving signal line Gate N+1 in $(N+1)^{th}$ row, a first electrode of the fifth transistor T5 is connected to a high level power supply terminal ELVDD, a second electrode of the fifth transistor T5 is connected to a first electrode of the organic electroluminescent diode OLED and a second terminal of the first storage capacitor C1, a second electrode of the organic electroluminescent diode OLED is connected to a low level power supply terminal ELVSS.

All of the first transistor T1, the second transistor T2, the third transistor T3, the fourth transistor T4 and the fifth transistor T5 may be N-type transistors or P-type transistors. Operations of the fingerprint identification substrate will be illustrated below by taking the first transistor T1, the second transistor T2, the third transistor T3, the fourth transistor T4 and the fifth transistor T5 being N-type transistors as an example.

In the embodiment, operations of the fingerprint identification substrate may include first through third stages as described below.

At the first stage (reset stage), a high level signal is input to the driving signal line Gate N in $N^{th}$ row, the third transistor T3 is turned on, a reset signal input through the reset signal line Reset Line is transmitted to the control electrode of the second transistor T2 and the first terminal (i.e., N terminal of a PN junction) of the rectifying diode PN via the third transistor T3, to initialize the first terminal of the rectifying diode PN such that the potential of the first node A is at a low level, and the second transistor T2 is turned off.

At the second stage (charge accumulation stage), the ultrasonic signal reflected by the valley or ridge of the fingerprint is converted into the corresponding electric signal by the piezoelectric material layer of the receiving part RX, and the electric signal flows through the PN junction of the rectifying diode PN to raise the potential of the first node A. At this stage, as long as the ultrasonic signal reflected by the finger increases with respect to that at previous moment, the potential of the first node A will be raised continuously through the PN junction. Since the ultrasonic signal reflected by the valley of the fingerprint is different from that reflected by the ridge of the fingerprint (e.g., in intensity or amplitude), the difference between charges at the first node A accumulated through the signal reflected by the valley of the fingerprint and charges at the first node A accumulated through the signal reflected by the ridge of the fingerprint will be larger and larger over time. Thus, a difference between the potential of the control electrode of the second transistor T2 relating to the valley of the fingerprint and the potential of the control electrode of the second transistor T2 relating to the ridge of the fingerprint will be larger and larger over time.

At the third stage (read stage), a low level signal is input to the driving signal line Gate N in $N^{th}$ row, a high level signal is input to the driving signal line Gate N+1 in $(N+1)^{th}$ row, the third transistor T3 is turned off, the first transistor T1 is turned on, and a first power supply voltage is input to the first power supply terminal Vd. Since charges at the first node A accumulated by the signal reflected by the valley of the fingerprint are different from charges at the first node A accumulated by the signal reflected by the ridge of the fingerprint, the potential of the control electrode of the second transistor T2 relating to the valley of the fingerprint is different from the potential of the control electrode of the second transistor T2 relating to the ridge of the fingerprint, thus the conduction state (conduction degree) of the second transistor T2 relating to the valley of the fingerprint is different the conduction state (conduction degree) relating to the ridge of the fingerprint, the potential of the first electrode of the second transistor T2 delivered from the first power supply voltage of the first power supply terminal Vd through the second transistor T2 relating to the valley of the fingerprint is different from the potential of the first electrode of the second transistor T2 delivered from the first power supply voltage of the first power supply terminal Vd through the second transistor T2 relating to the ridge of the fingerprint, thus it may be determined whether the electric signal read by the read signal line Read Line is relating to the valley or the ridge of the fingerprint. The electric signal may be a voltage signal or a current signal. In a case where there is no fingerprint operation, the receiving part RX cannot receive a signal reflected by the fingerprint, the control electrode of the second transistor T2 is maintained at the low level, the second transistor T2 is turned off, and the signal of the read signal line Read Line is constant.

At the second stage (i.e., charge accumulation stage), if there is a relative large (e.g., 1 pA level) leakage of electricity at the first node A, the difference between the charges at the first node A accumulated through the signal reflected by the valley of the fingerprint and the charges at the first node A accumulated through the signal reflected by the ridge of the fingerprint would be relative small, and in a case where the charges accumulated at the first node A are less than the leakage of electricity at the first node A, the valley and the ridge of the fingerprint cannot be distinguished from each other during fingerprint identifying. In order to stabilize the potential of the first node A, the second storage capacitor C2 is provided to connect to the first node A so as to reduce an attenuation of signal caused by leakage of electricity.

When the fingerprint identification substrate is used as the display substrate, display operations of the display substrate may include: input a high level signal to the driving signal line Gate N+1, the fourth transistor T4 is turned on, the first terminal of the first storage capacitor C1 is charged by a data voltage signal input from the data line Data Line until that a threshold voltage of the fifth transistor T5 is reached, the fifth transistor T5 is turned on, the organic electroluminescent diode OLED is driven to emit light, thus the display substrate performs displaying. The first transistor T1 and the second transistor T2 of the fingerprint detector may be low temperature polysilicon thin film transistors (LTPS TFTs). A slop of linear region of the low temperature polysilicon thin film transistor is relatively gentle, compared with the oxide based thin film transistor having a linear region sloping sharply, under different gate voltages, the low temperature polysilicon thin film transistor can output different currents more accurately. Thus, by detecting the current output from the low temperature polysilicon thin film transistor, the voltage (i.e., the potential at a read node) for turning on the low temperature polysilicon thin film transistor can be determined, thereby the fingerprint can be identified more accurately.

The third transistor T3 of the fingerprint detector may be the oxide based thin film transistor, and an active layer of the oxide based thin film transistor may be formed of indium gallium tin oxide, indium tin oxide, indium gallium zinc oxide, zinc oxide or the like. The leakage of electricity of the oxide based thin film transistor is relative small (generally below $10^{-13}$ A), thus can minimize a loss of charges at the read node, the potential of the read node can be maintained, thereby the on-off state of the second transistor T2 can be controlled accurately.

When the fingerprint identification substrate is used as the display substrate, the fourth transistor T4 and the fifth transistor T5 of each pixel unit in the display substrate may also be oxide based thin film transistors. The fourth transistor T4 using the oxide based thin film transistor can latch the signal to prevent the leakage of electricity. The fifth transistor T5 using the oxide based thin film transistor can achieve a small size design of transistor, thus a design of high resolution (e.g., pixel per inch, PPI) can be realized. In some implementations, the display substrate includes a plurality of pixel units, the driving signal lines (Gate N, Gate N+1, etc.) are multiplexed as gate lines during displaying of the display substrate, for providing gate driving signals to the corresponding pixel units. Specifically, each pixel unit includes a pixel driving circuit, and the driving signal lines provide gate driving signals to the pixel driving circuit to control operations of the pixel driving circuit.

An embodiment of the present disclosure further provides a fingerprint identification method using the fingerprint identification substrate described above. The fingerprint identification method includes: applying a driving voltage to the transmitting part TX of the fingerprint identification substrate so as to drive the transmitting part TX to generate an ultrasonic signal (step S1); receiving, by the receiving part RX of the fingerprint identification substrate, the ultrasonic signal reflected by a finger, converting the ultrasonic signal into an electric signal and outputting the electric signal to the fingerprint detector (step S2); and determining fingerprint information, by the fingerprint detector, according to the electric signal output from the receiving part RX (step S3).

Figure 8:
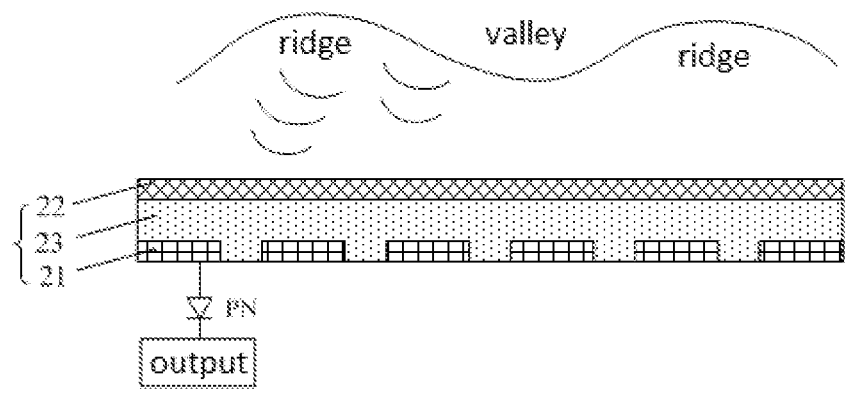
FIG. 8 shows a diagram of a connection between a receiving part and a rectifying diode in the fingerprint identification substrate in accordance with an embodiment of the present disclosure.
Figure 9:
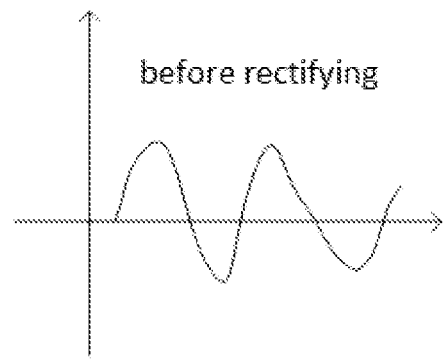
FIG. 9 shows a diagram of an electric signal output from a third electrode of the receiving part shown in FIG. 8.
Figure 10:
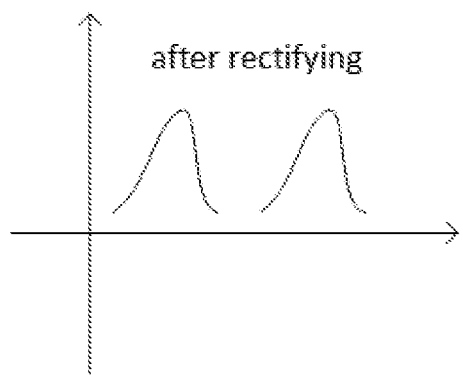
FIG. 10 shows a diagram of an electric signal output from the rectifying diode shown in FIG. 8.

At the step S1, a driving voltage is applied across the first electrode 11 and the second electrode 12, and the first piezoelectric material layer 13 between the first electrode 11 and the second electrode 12 generates an ultrasonic signal. At the step S2, as shown in FIG. 8, when the fourth electrode 22 of the receiving part RX receives the ultrasonic signal reflected by the finger, the second piezoelectric material layer 23 converts the ultrasonic signal into an electric signal and outputs the electric signal to the rectifying diode PN (i.e., the PN junction thereof) of the fingerprint detector through the third electrode 21. Since the rectifying diode PN is one-way electrically conductive, i.e., the rectifying diode PN is equivalent to a filter, the electric signal (i.e., sine wave signal) output from the third electrode 21 shown in FIG. 9 can be rectified and converted, by the rectifying diode PN, into the one-way electric signal shown in FIG. 10.

The step S3 may include following first through third stages.

At the first stage (reset stage), a high level signal is input to the driving signal line Gate N in $N^{th}$ row, a reset signal is input to the reset signal line Reset Line. At this stage, the third transistor T3 is turned on, the reset signal is transferred to the control electrode of the second transistor T2 and the first terminal (i.e., N terminal of the PN junction) of the rectifying diode PN through the third transistor T3, to initialize the first terminal of the rectifying diode PN, so that the potential of the first node A is at the low level, and the second transistor T2 is turned off.

At the second stage (charge accumulation stage), a period of time is waited for. At this stage, if a finger touches the fingerprint identification substrate, the ultrasonic signal reflected by the valley or ridge of the fingerprint of the finger is converted into the corresponding electric signal by the piezoelectric material layer of the receiving part RX, the electric signal flows through the PN junction of the rectifying diode PN so that the potential of the first node A is raised. At this stage, as long as the ultrasonic signal reflected by the finger increases with respect to that at previous moment, the potential of the first node A will be raised continuously through the PN junction. Since the ultrasonic signal reflected by the valley of the fingerprint is different from that reflected by the ridge of the fingerprint (e.g., in intensity or amplitude), the difference between charges at the first node A accumulated through the signal reflected by the valley of the fingerprint and charges at the first node A accumulated through the signal reflected by the ridge of the fingerprint will be larger and larger over time. Thus, a difference between the potential of the control electrode of the second transistor T2 relating to the valley of the fingerprint and the potential of the control electrode of the second transistor T2 relating to the ridge of the fingerprint will be larger and larger over time. Therefore, at this stage, the period of time to be waited for may be long enough so that the valley or ridge of the fingerprint can be identified accurately according to the charges accumulated at the first node A.

At the third stage (read stage), a low level signal is input to the driving signal line Gate N in $N^{th}$ row, a high level signal is input to the driving signal line Gate N+1 in $(N+1)^{th}$ row, the first power supply voltage is input to the first power supply terminal Vd, and the potential of the first electrode of the second transistor T2 is read through the read signal line Read Line to determine the fingerprint information. At this stage, the third transistor T3 is turned off, the first transistor T1 is turned on. Since charges at the first node A accumulated by the signal reflected by the valley of the fingerprint are different from charges at the first node A accumulated by the signal reflected by the ridge of the fingerprint, the potential of the control electrode of the second transistor T2 relating to the valley of the fingerprint is different from the potential of the control electrode of the second transistor T2 relating to the ridge of the fingerprint, thus the conduction state (conduction degree) of the second transistor T2 relating to the valley of the fingerprint is different the conduction state (conduction degree) relating to the ridge of the fingerprint, the potential of the first electrode of the second transistor T2 delivered from the first power supply voltage of the first power supply terminal Vd through the second transistor T2 relating to the valley of the fingerprint is different from the potential of the first electrode of the second transistor T2 delivered from the first power supply voltage of the first power supply terminal Vd through the second transistor T2 relating to the ridge of the fingerprint, thus it may be determined whether the electric signal read by the read signal line Read Line is relating to the valley or the ridge of the fingerprint. The electric signal may be a voltage signal or a current signal. In a case where there is no fingerprint operation, the receiving part RX cannot receive a signal reflected by the fingerprint, the control electrode of the second transistor T2 is maintained at the low level, the second transistor T2 is turned off, and the signal of the read signal line Read Line is constant.

An embodiment of the present disclosure further provides a display device including the fingerprint identification substrate described above which is used as a display substrate. Thus, the display device has a fingerprint identification function.

In the display device, the fingerprint identification substrate used as the display substrate may be divided into a plurality of pixel regions, and each pixel region may be provided with at least one transmitting part TX and at least one receiving part RX. In some implementations, each pixel region may be provided with one transmitting part TX, one receiving part RX and at least one sub-pixel.

The display device may be a liquid crystal display device or electroluminescent display device, and may be any product or member having display function, such as liquid crystal panel, electronic paper, OLED panel, mobile phone, tablet computer, television, display, notebook computer, digital photo frame, and navigator.

It should be understood that, the above embodiments are merely exemplary embodiments for explaining principle of the present disclosure, but the present disclosure is not limited thereto. Various modifications and improvements may be made by those ordinary skilled in the art without departing from the concept of the present disclosure, these modifications and improvements fall into the protection scope of the present disclosure.

The invention claimed is:

1. A fingerprint identification substrate, comprising:
   a base substrate;
   a transmitting part provided on the base substrate and configured to generate an ultrasonic signal;
   a receiving part provided on the base substrate and configured to receive the ultrasonic signal reflected by a finger, convert the ultrasonic signal into an electric signal, and output the electric signal to a fingerprint detector; and
   the fingerprint detector configured to determine fingerprint information according to the electric signal output from the receiving part, wherein
   at least a portion of the transmitting part and at least a portion of the receiving part are provided in a single layer,
   wherein the transmitting part comprises a first electrode, a first piezoelectric material layer and a second electrode provided successively in a direction away from the base substrate; and
   the receiving part comprises a third electrode, a second piezoelectric material layer and a fourth electrode provided successively in a direction away from the base substrate, and
   the fingerprint identification substrate further comprises a plurality of driving signal lines, a plurality of read signal lines and a plurality of reset signal lines provided above the base substrate, wherein the fingerprint detector comprises a rectifying diode, a first transistor, a second transistor and a third transistor,
   a first electrode of the rectifying diode is connected to the third electrode, a second electrode of the rectifying diode is connected to a first node;
   a first electrode of the first transistor is connected to a corresponding one of the read signal lines, a second electrode of the first transistor is connected to a first electrode of the second transistor, a control electrode of the first transistor is connected to the driving signal line in $(N+1)^{th}$ row, where N is an integer larger than or equal to 1;
   the first electrode of the second transistor is connected to the second electrode of the first transistor, a second electrode of the second transistor is connected to a first power supply terminal, a control electrode of the second transistor is connected to the first node;
   a first electrode of the third transistor is connected to a corresponding one of the reset signal lines, a second electrode of the third transistor is connected to the first node, a control electrode of the third transistor is connected to the driving signal line in $N^{th}$ row; and
   the first node is a connection node connected to the second electrode of the third transistor, the second electrode of the rectifying diode and the control electrode of the second transistor.

2. The fingerprint identification substrate of claim 1, wherein the first piezoelectric material layer and the second piezoelectric material layer are provided in a single layer, and are formed into a single structure by a same material.

3. The fingerprint identification substrate of claim 1, wherein the first electrode and the third electrode are provided in a single layer and formed of a same material.

4. The fingerprint identification substrate of claim 1, wherein the second electrode and the fourth electrode are formed in a single layer and formed of a same material.

5. The fingerprint identification substrate of claim 1, further comprising a plurality of data lines and a plurality of pixel units, wherein each pixel unit comprises a fourth transistor, a fifth transistor, a first storage capacitor and an organic electroluminescent diode, wherein
   a first electrode of the fourth transistor is connected to a corresponding one of the data lines, a second electrode of the fourth transistor is connected to a control electrode of the fifth transistor and a first terminal of the first storage capacitor, a control electrode of the fourth transistor is connected to the driving signal line in $(N+1)^{th}$ row; and
   a first electrode of the fifth transistor is connected to a high level power supply terminal, a second electrode of the fifth transistor is connected to a first electrode of the organic electroluminescent diode and a second terminal of the first storage capacitor, a second electrode of the organic electroluminescent diode is connected to a low level power supply terminal.

6. The fingerprint identification substrate of claim 5, wherein the first transistor and the second transistor are low temperature polysilicon thin film transistors; and
   the third transistor, the fourth transistor and the fifth transistor are oxide based thin film transistors.

7. The fingerprint identification substrate of claim 1, further comprising a first electrode line connected to the first electrode, the fingerprint detector further comprises a second storage capacitor, wherein
   a first terminal of the second storage capacitor is connected to the first node, and a second terminal of the second storage capacitor is connected to the first electrode line.

8. The fingerprint identification substrate of claim 1, wherein the fingerprint identification substrate comprises a plurality of pixel regions, and each pixel region is provided with one transmitting part and one receiving part.

9. The fingerprint identification substrate of claim 1, further comprising an air cavity below the transmitting part.

10. The fingerprint identification substrate of claim 1, wherein the first electrode and the second electrode are plate electrodes.

11. A display device, comprising the fingerprint identification substrate of claim 1, wherein the fingerprint identification substrate is configured to be a display substrate of the display device.

12. A fingerprint identification method using a fingerprint identification substrate, the fingerprint identification substrate comprises a base substrate, a transmitting part provided on the base substrate, a receiving part provided on the base substrate, wherein at least a portion of the transmitting part and at least a portion of the receiving part are provided in a single layer, the fingerprint identification method comprising:
   step S1, generating, by the transmitting part, an ultrasonic signal;
   step S2, receiving, by the receiving part, the ultrasonic signal reflected by a finger, converting the ultrasonic signal into an electric signal and outputting the electric signal to a fingerprint detector; and
   step S3, determining fingerprint information, by the fingerprint detector, according to the electric signal output from the receiving part,
   wherein the transmitting part comprises a first electrode, a first piezoelectric material layer and a second electrode provided successively in a direction away from the base substrate, and the receiving part comprises a third electrode, a second piezoelectric material layer and a fourth electrode provided successively in a direction away from the base substrate, the fingerprint identification substrate further comprises a plurality of driving signal lines, a plurality of read signal lines and a plurality of reset signal lines provided above the base substrate, the fingerprint detector comprises a rectifying diode, a first transistor, a second transistor and a third transistor, a first electrode of the rectifying diode is connected to the third electrode, a second electrode of the rectifying diode is connected to a first node, a first electrode of the first transistor is connected to a corresponding one of the read signal lines, a second electrode of the first transistor is connected to a first electrode of the second transistor, a control electrode of the first transistor is connected to the driving signal line in $(N+1)^{th}$ row, where N is an integer larger than or equal to 1, the first electrode of the second transistor is connected to the second electrode of the first transistor, a second electrode of the second transistor is connected to a first power supply terminal, a control electrode of the second transistor is connected to the first node, a first electrode of the third transistor is connected to a corresponding one of the reset signal lines, a second electrode of the third transistor is connected to the first node, a control electrode of the third transistor is connected to the driving signal line in $N^{th}$ row, and the first node is a connection node connected to the second electrode of the third transistor, the second electrode of the rectifying diode and the control electrode of the second transistor, the step S3 comprises:

a reset stage, inputting a high level signal to the driving signal line in $N^{th}$ row, and inputting a reset signal to the reset signal line;

a charge accumulation stage, waiting for a period of time; and a read stage, inputting a low level signal to the driving signal line in $N^{th}$ row, inputting a high level signal to the driving signal in $(N+1)^{th}$ row, inputting a first power supply voltage to the first power supply terminal, and determining the fingerprint information by reading a potential of the first electrode of the second transistor through the read signal line.

* * * * *